United States Patent
Jang et al.

(10) Patent No.: US 12,294,146 B2
(45) Date of Patent: May 6, 2025

(54) ANTENNA MODULE

(71) Applicant: AMOSENSE CO., LTD, Cheonan-si (KR)

(72) Inventors: Kil Jae Jang, Cheonan-si (KR); Dong Hoon Lee, Cheonan-si (KR); Sung Hyun Park, Cheonan-si (KR)

(73) Assignee: AMOSENSE CO., LTD, Cheonan-si (KR)

( * ) Notice: Subject to any disclaimer, the term of this patent is extended or adjusted under 35 U.S.C. 154(b) by 158 days.

(21) Appl. No.: 18/040,799

(22) PCT Filed: Jul. 27, 2021

(86) PCT No.: PCT/KR2021/009697
§ 371 (c)(1),
(2) Date: Feb. 6, 2023

(87) PCT Pub. No.: WO2022/030848
PCT Pub. Date: Feb. 10, 2022

(65) Prior Publication Data
US 2023/0282973 A1    Sep. 7, 2023

(30) Foreign Application Priority Data
Aug. 7, 2020  (KR) .................. 10-2020-0099030

(51) Int. Cl.
*H01Q 1/52*     (2006.01)
*H01Q 1/38*     (2006.01)
(Continued)

(52) U.S. Cl.
CPC ............ *H01Q 1/526* (2013.01); *H01Q 1/38* (2013.01); *H01Q 7/00* (2013.01); *G06Q 20/3278* (2013.01)

(58) Field of Classification Search
CPC ............ H01Q 1/526; H01Q 1/38; H01Q 7/00; H01Q 7/04; H01Q 1/52; H01Q 1/24;
(Continued)

(56) References Cited

U.S. PATENT DOCUMENTS

2018/0138580 A1* 5/2018 Kim .................. H01Q 1/243
2018/0277954 A1* 9/2018 Lee .................... H01Q 9/27

FOREIGN PATENT DOCUMENTS

JP          2017-220850 A     12/2017
KR    10-2017-0062415 A      6/2017
(Continued)

OTHER PUBLICATIONS

International Search Report for PCT/KR2021/009697 by Korean Intellectual Property Office dated Nov. 9, 2021.

*Primary Examiner* — David E Lotter
(74) *Attorney, Agent, or Firm* — BROADVIEW IP LAW, PC

(57) ABSTRACT

An antenna module is provided. An antenna module according to an exemplary embodiment of the present invention comprises: a circuit board; a radiation pattern formed on at least one surface of the circuit board and formed in a loop shape to have an empty space part formed at a central part thereof; a first shielding sheet stacked on the upper surface of the circuit board to include an area corresponding to the empty space part; and a second shielding sheet stacked on the lower surface of the circuit board to include an area corresponding to the empty area part, wherein the first shielding sheet and the second shielding sheet are disposed such that the areas corresponding to the empty space part on the opposite surfaces of the circuit board overlap each other.

7 Claims, 6 Drawing Sheets

(51) Int. Cl.
*H01Q 7/00* (2006.01)
*G06Q 20/32* (2012.01)

(58) Field of Classification Search
CPC .... H01Q 1/243; G06Q 20/3278; G06K 19/06; G06K 19/06187
See application file for complete search history.

(56) References Cited

FOREIGN PATENT DOCUMENTS

| | | | |
|---|---|---|---|
| KR | 10-2018-0055664 A | 5/2018 |
| KR | 10-2018-0108364 A | 10/2018 |
| KR | 10-2020-0055237 A | 5/2020 |

* cited by examiner

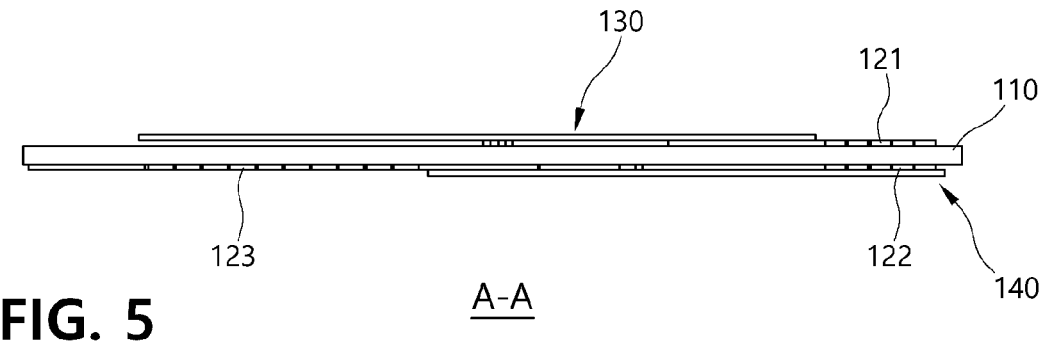
FIG. 5  A-A
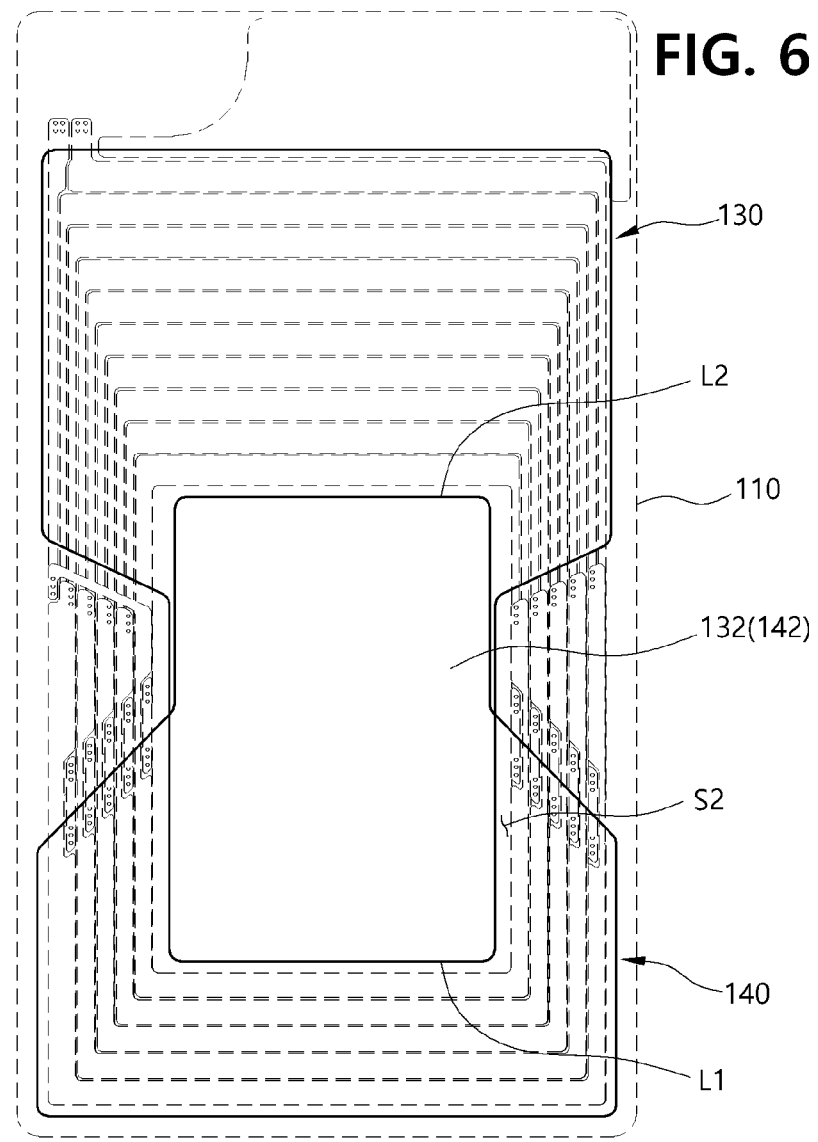
FIG. 6

ANTENNA MODULE

CROSS-REFERENCE TO RELATED APPLICATIONS

This application is a National Phase Entry Application of PCT Application No. PCT/KR2021/009697 filed on Jul. 27, 2021, which claims priority to Korean Patent Application No. 10-2020-0099030 filed on Aug. 7, 2020, in Korean Intellectual Property Office, the entire contents of which are hereby incorporated by reference in its entirety.

TECHNICAL FIELD

The present invention relates to an antenna module.

BACKGROUND ART

Portable terminal devices, such as smart phones, include various functions such as information exchange between terminals, payments, and the like using near-field communication.

In addition, recently, since electronic payment functions using portable terminal devices, such as Apple Pay and Samsung Pay, are required in the portable terminal devices, an antenna module for electronic payment is built in the portable terminal devices.

As an example, Samsung Pay is an electronic payment method using a magnetic secure transmission scheme, and thus a magnetic secure transmission (MST) antenna is mounted in portable terminal devices supporting Samsung Pay.

The MST antenna configures a combo antenna together with a near field communication (NFU) antenna or a wireless charging antenna, or configures an antenna alone.

Meanwhile, when the MST antenna configures an antenna alone, an antenna module including the MST antenna tends to be miniaturized due to factors such as narrow space and unit cost of a portable terminal device.

As an example, an MST antenna module includes an MST antenna for electronic payment and a magnetic field shielding sheet, and a sheet separated into a plurality of pieces through flake treatment is used as the magnetic field shielding sheet to reduce loss due to an eddy current.

However, the magnetic field shielding sheet separated into a plurality of pieces through flake treatment has a problem in that a permeability is low and a magnetic field leaks through gaps between the separated pieces, resulting in deterioration in performance.

Since the MST antenna usually operates in a band of several tens of kHz, the loss due to an eddy current is insignificant.

Accordingly, it is necessary to maximize the performance of the MST antenna by minimizing the leakage of the magnetic field while minimizing the occurrence of loss due to the eddy current.

DISCLOSURE

Technical Problem

The present invention is directed to providing an antenna module capable of improving a recognition rate by increasing antenna performance.

Technical Solution

One aspect of the present invention provides an antenna module including a circuit board, a radiation pattern formed on at least one surface of the circuit board and patterned in a loop shape so that an empty space part is formed at a central part thereof, a first shielding sheet stacked on an upper surface of the circuit board so as to include a region corresponding to the empty space part, and a second shielding sheet stacked on a lower surface of the circuit board so as to include a region corresponding to the empty space part, wherein the first shielding sheet and the second shielding sheet are disposed on both surfaces of the circuit board such that areas thereof corresponding to the empty space part overlap each other.

Each of the first shielding sheet and the second shielding sheet may be a sheet that is not divided into a plurality of pieces in a region overlapping the radiation pattern.

Each of the first shielding sheet and the second shielding sheet may include one or more cracks extending from an edge, and the one or more cracks may not be formed in the region overlapping the radiation pattern.

Each of the first shielding sheet and the second shielding sheet may be a ribbon sheet of an amorphous alloy or a nanocrystalline alloy.

At least one of the first shielding sheet and the second shielding sheet may be a multilayer sheet in which a plurality of sheets are stacked in multiple layers, wherein each of the sheets may be a ribbon sheet of an amorphous alloy or a nanocrystalline alloy.

The first shielding sheet may include a first portion covering a portion of the upper surface of the circuit board and a second portion extending from the first portion so as to cover the region corresponding to the empty space part, and the second portion may be disposed such that an edge protruding from the first portion is located within an edge defining the empty space part.

The second shielding sheet may include a first portion covering a portion of the lower surface of the circuit board and a second portion extending from the first portion so as to cover the region corresponding to the empty space part, and the second portion may be disposed such that an edge protruding from the first portion is located within an edge defining the empty space part.

The radiation pattern may include a first pattern formed on the upper surface of the circuit board, a second pattern formed on the lower surface of the circuit board and formed in a region corresponding to the first pattern, and a third pattern formed on the lower surface of the circuit board and formed in a region not corresponding to the first pattern to form the empty space part, and the first shielding sheet may be disposed on the upper surface of the circuit board to cover a region corresponding to the third pattern, without covering the first pattern.

The radiation pattern may be a magnetic secure transmission (MST) antenna.

Advantageous Effects

According to the present invention, antenna performance can be improved by reducing a loss due to an eddy current through a plurality of cracks unintentionally formed on an edge side while having a high permeability.

In addition, according to the present invention, antenna performance can be improved, and a recognition rate can be increased by arranging a pair of shielding sheets so as to overlap an empty space part of an antenna, in which a magnetic field is concentrated.

DESCRIPTION OF DRAWINGS

FIG. 5 is a cross-sectional view taken along line A-A of FIG. 1.

FIG. 6 is a view conceptually illustrating a portion at which a first shielding sheet and a second shielding sheet overlap, in the antenna module according to one embodiment of the present invention.

MODES OF THE INVENTION

Figure 1:
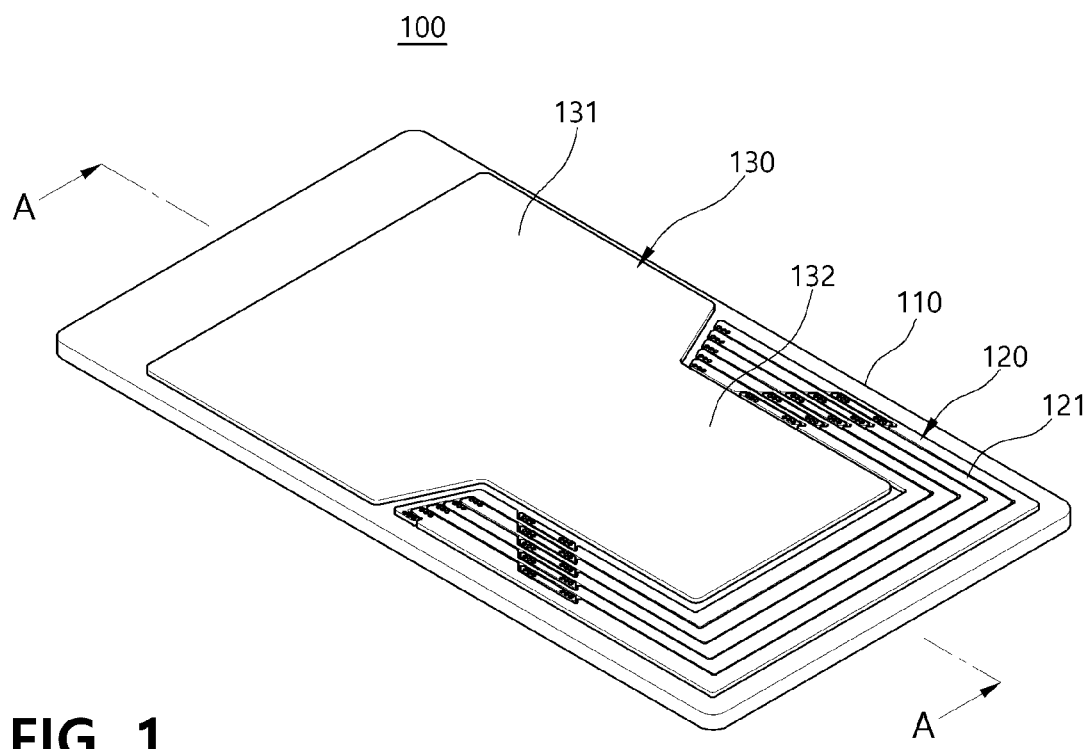
FIG. 1 is a view illustrating an antenna module according to one embodiment of the present invention.

Hereinafter, embodiments of the present invention will be described in detail with reference to the accompanying drawings which may allow one of ordinary skill in the art to easily carry out the present invention. The present invention may be implemented in various forms and is not limited to the following embodiments. Parts not related to the description are not included in the drawings to clearly describe the present invention, and the same reference symbols are used for the same or similar components in the description.

As shown in FIGS. 1 to 5, an antenna module 100 according to one embodiment of the present invention includes a circuit board 110, radiation patterns 120, a first shielding sheet 130, and a second shielding sheet 140.

The radiation patterns 120 may each be formed in a loop shape on at least one surface of the circuit board 110, and may serve as an antenna for electronic payment.

Figure 2:
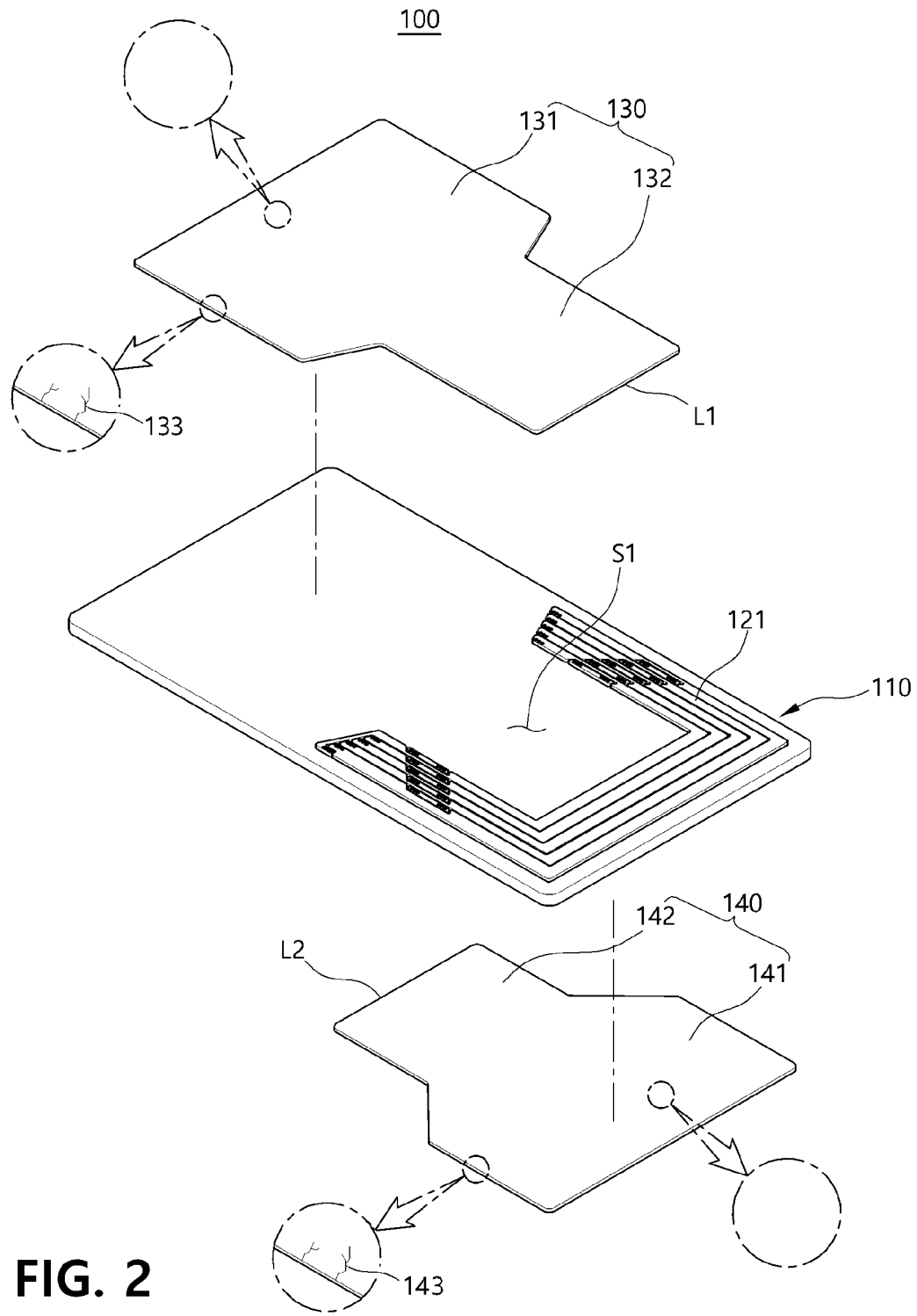
FIG. 2 is an exploded view of FIG. 1.
Figure 4:
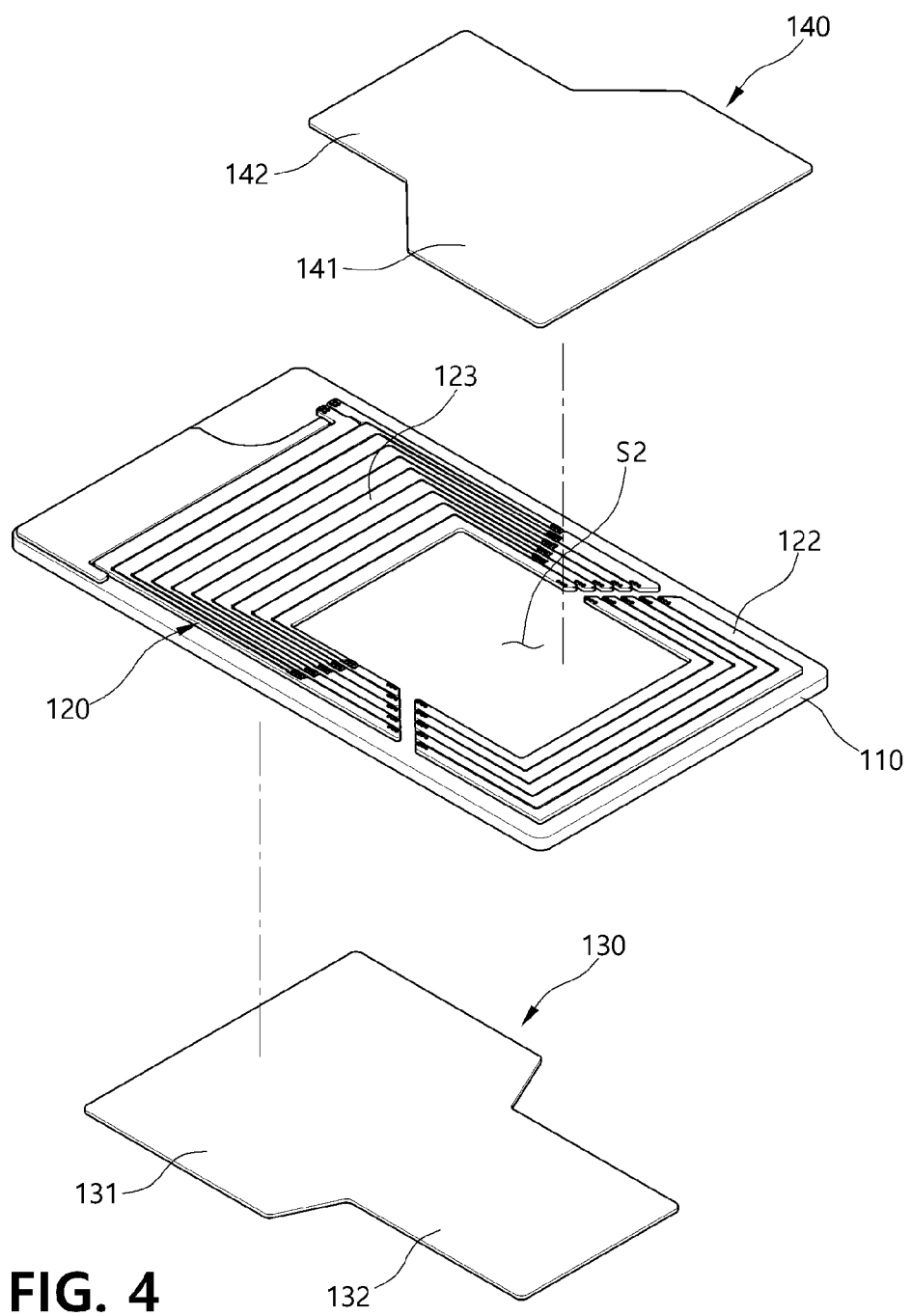
FIG. 4 is an exploded view of FIG. 3.

As an example, as shown in FIGS. 2 and 4, the radiation patterns 120 may include a first pattern 121 formed on an upper surface of the circuit board 110, and a second pattern 122 and a third pattern 123 formed on a lower surface of the circuit board 110, and the first pattern 121, the second pattern 122, and the third pattern 123 may be electrically connected to each other.

In this case, the second pattern 122 may be formed in a region of the lower surface of the circuit board 110 corresponding to the first pattern 121 formed on the upper surface of the circuit board 110, and the third pattern 123 may be formed in a region of the lower surface of the circuit board 110 not corresponding to the first pattern 121.

Accordingly, the second pattern and the third pattern 123 may be patterned so as to form an empty space part S2 having a predetermined area at a central part of the lower surface of the circuit board 110, and the first pattern 121 may have an empty space part S1 having one open side on the upper surface of the circuit board 110.

In this case, the empty space part S1 formed by the first pattern 121 may be formed at a position corresponding to a partial area of the entire area of the empty space part S2 formed by the second pattern 122 and the third pattern 123.

However, the formation method of the radiation patterns 120 is not limited thereto, and the radiation patterns 120 may be formed in various ways as long as the empty space parts S1 and S2 having a predetermined area may be formed in the central part. That is, the radiation patterns 120 may be formed only on the upper surface of the circuit board 110, may be formed only on the lower surface of the circuit board 110, or may be formed on the upper and lower surfaces of the circuit board 110 at positions corresponding to each other.

In addition, the radiation patterns 120 may be a magnetic secure transmission (MST) antenna using a magnetic secure transmission scheme, but the function of the radiation patterns 120 is no limited thereto, and the radiation patterns 120 may serve as a wireless power transfer antenna for wireless power transfer or may serve as a near field communication (NFC) antenna for near-field wireless communication.

The first shielding sheet 130 and the second shielding sheet 140 may shield magnetic fields generated from the radiation patterns 120 and focus the magnetic fields in a desired direction.

To this end, each of the first shielding sheet 130 and the second shielding sheet 140 may be made of a material having a magnetic property.

As an example, all known materials used as a magnetic field shielding sheet such as a ribbon sheet of an amorphous alloy or a nanocrystalline alloy, a ferrite sheet, a polymer sheet, a permalloy sheet, or the like may be used for each of the first shielding sheet 130 and the second shielding sheet 140.

As a non-limiting example, at least one of the first shielding sheet 130 and the second shielding sheet 140 may be a ribbon sheet of an amorphous alloy or a nanocrystalline alloy so as to have a high permeability while having a small thickness.

Here, the ribbon sheet may be a heat-treated Fe-based alloy ribbon, and the Fe-based alloy may be a ternary alloy including iron (Fe), silicon (Si), boron (B), and other impurities, a quaternary alloy including iron (Fe), boron (B), carbon (C), copper (Cu), and other impurities, and a quinary alloy including iron (Fe), silicon (Si), boron (B), copper (Cu), niobium (Nb), and other impurities, or iron (Fe), boron (B), carbon (C), copper (Cu), niobium (Nb), and other impurities. In addition, the Fe-based alloy may include an amorphous or nanocrystalline structure.

Figure 7:
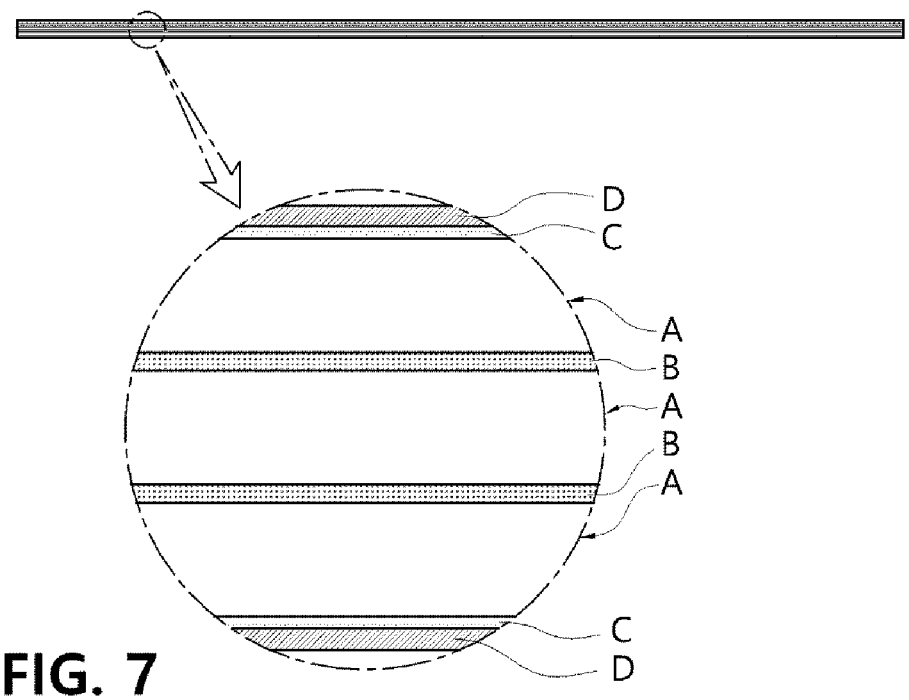
FIG. 7 is a cross-sectional view illustrating a multilayer sheet applicable to the first shielding sheet and the second shielding sheet, in the antenna module according to one embodiment of the present invention.

In addition, when at least one of the first shielding sheet 130 and the second shielding sheet 140 is formed of a ribbon sheet, as shown in FIG. 7, the sheet formed of the ribbon sheet may be a multilayer sheet in which a plurality of ribbon sheets A are stacked in multiple layers through adhesive layers B. In this case, the multilayer sheet may include protective films D attached to an upper surface and a lower surface through adhesive layers C, and the protective films D may be release films to be removed when used.

In this case, each of the first shielding sheet 130 and the second shielding sheet 140 may be a sheet that is not separated into a plurality of pieces so that a high permeability is realized while minimizing the leakage of a magnetic field passing through the sheet itself. In particular, each of the first shielding sheet 130 and the second shielding sheet 140 may not be separated into a plurality of pieces in a region overlapping the radiation pattern 120.

In addition, the first shielding sheet 130 and the second shielding sheet 140 may include one or more cracks 133 and 143 extending from edges thereof, respectively.

In this case, the one or more cracks 133 and 143 may not be formed in inner sides of the first shielding sheet 130 and the second shielding sheet 140, respectively, and the one or more cracks 133 and 143 may be unintentionally formed in a process of processing the edges to punch the sheet itself into a predetermined size.

That is, as can be seen from the enlarged view of FIG. 2, the first shielding sheet 130 and the second shielding sheet 140 may be sheets in which the cracks 133 and 143 are not formed in inner regions excluding the edges while cracks 133 and 143 are unintentionally formed on the edges, respectively, in a process of processing the sheet itself. In other words, the cracks 133 and 143 may not be formed in regions overlapping the radiation patterns 120 in the first shielding sheet 130 and the second shielding sheet 140, respectively.

Accordingly, each of the first shielding sheet 130 and the second shielding sheet 140 applied to the antenna module 100 according to one embodiment of the present invention may have minimal cracks formed only on the edge side without being formed by dividing the entire sheet itself.

As a result, each of the first shielding sheet 130 and the second shielding sheet 140 applied to the antenna module 100 according to one embodiment of the present invention may be realized as sheet having a high permeability because the sheet itself is not divided. In addition, since the first shielding sheet 130 and the second shielding sheet 140 include minimum cracks 133 and 143 unintentionally formed on the edge sides of the sheets, respectively, loss due to an eddy current may be reduced. In addition, the amount of leakage of the magnetic field leaking through each of the minimum cracks of the first shielding sheet 130 and the second shielding sheet 140 may be minimized, so that each of the first shielding sheet 130 and the second shielding sheet 140 may increase the performance of the radiation pattern 120.

In this case, the first shielding sheet 130 and the second shielding sheet 140 applied to the antenna module 100 according to one embodiment of the present invention may be disposed on the upper surface and the lower surface of the circuit board 110, respectively, and may be arranged such that some areas thereof overlap each other.

That is, the first shielding sheet 130 may be stacked on the upper surface of the circuit board 110 so as to include a region corresponding to the empty space part S1 formed on the upper surface of the circuit board 110, and the second shielding sheet 140 may be stacked on the lower surface of the circuit board 110 so as to include a region corresponding to the empty space part S2 formed on the lower surface of the circuit board 110.

Here, the empty space part S1 formed on the upper surface of the circuit board 110 may be formed at a position corresponding to a partial area of the entire area of the empty space part S2 formed on the lower surface of the circuit board 110. In addition, the empty space part S1 formed on the upper surface of the circuit board 110 may be formed by the first pattern 121, and the empty space part S2 formed on the lower surface of the circuit board 110 may be formed by the second pattern 122 and the third pattern 123.

Accordingly, the first shielding sheet 130 and the second shielding sheet 140 may be disposed on both surfaces of the circuit board 110 such that areas thereof corresponding to the empty space part S2, which is formed on the lower surface of the circuit board 110, overlap each other.

Specifically, as shown in FIGS. 1 and 2, the first shielding sheet 130 may include a first portion 131 covering a portion of the upper surface of the circuit board 110 and a second portion 132 extending from the first portion 131 so as to cover the region corresponding to the empty space part S1 formed on the upper surface of the circuit board 110.

Figure 3:
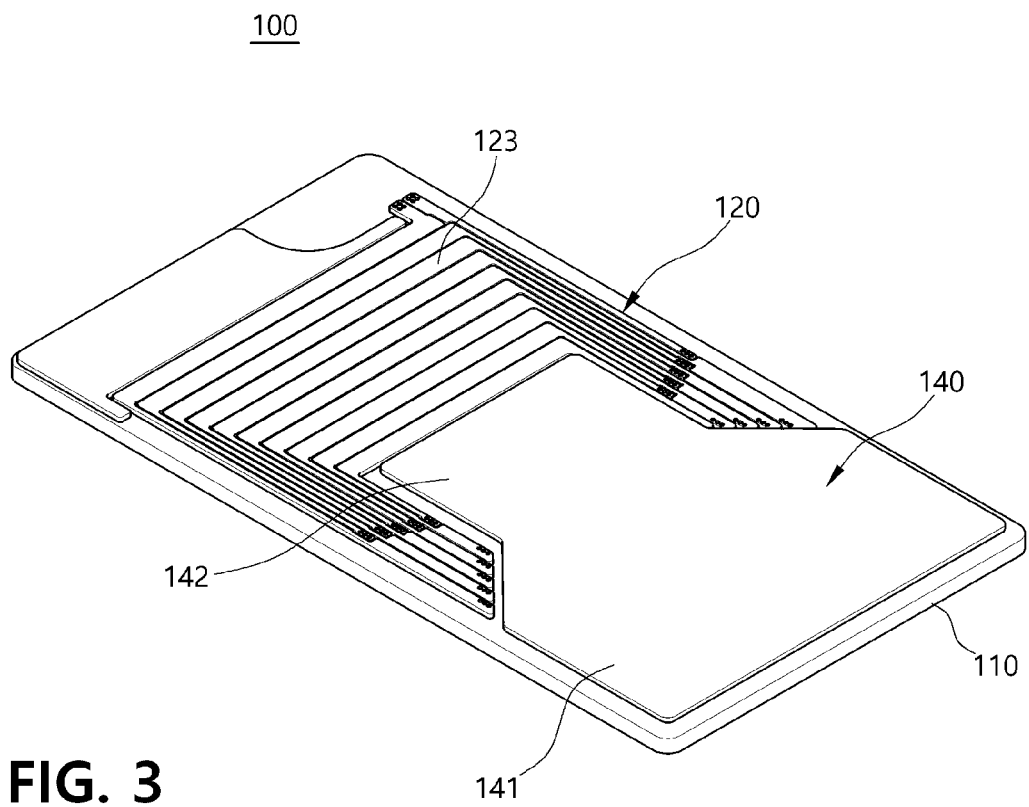
FIG. 3 is a view illustrating an opposite surface of the surface shown in FIG. 1.

In addition, as shown in FIGS. 3 and 4, the second shielding sheet 140 may include a first portion 141 covering a portion of the lower surface of the circuit board 110 and a second portion 142 extending from the first portion 141 so as to cover the region corresponding to the empty space part S2 formed on the lower surface of the circuit board 110.

In this case, the first shielding sheet 130 may be disposed on the upper surface of the circuit board 110 so as to cover a region corresponding to the third pattern 123 formed on the lower surface of the circuit board 110 without covering the first pattern 121 formed on the upper surface of the circuit board 110. In addition, the second shielding sheet 140 may be disposed on the lower surface of the circuit board 110 so as to cover the second pattern 122 formed on the lower surface of the circuit board 110, without covering the third pattern 123.

Accordingly, the first pattern 121 formed on the upper surface of the circuit board 110 may be exposed to the outside without being covered by the first shielding sheet 130 as shown in FIGS. 1 and 5, and the third pattern 123 formed on the lower surface of the circuit board 110 may be exposed to the outside without being covered by the second shielding sheet 140 as shown in FIGS. 3 and 5.

Accordingly, as shown in FIG. 6, the first shielding sheet 130 and the second shielding sheet 140 may be disposed on both surfaces of the circuit board 110 such that regions thereof corresponding to the empty space part S2, which is formed on the lower surface of the circuit board 110, overlap each other.

That is, in the antenna module 100 according to one embodiment of the present invention, the first shielding sheet 130 and the second shielding sheet 140 may overlap only in the region corresponding to the empty space part S2, which is formed on the lower surface of the circuit board 110 and is a region in which the magnetic field generated from the radiation pattern 120 is concentrated.

Accordingly, the magnetic field generated through the radiation pattern 120 may be focused in the region corresponding to the empty space part S2 formed on the lower surface of the circuit board 110, and then may be double-blocked through the first shielding sheet 130 and the second shielding sheet 140, thereby minimizing the amount of magnetic field leaking to the outside.

As a result, the antenna module 100 according to one embodiment of the present invention may increase the performance of the radiation pattern 120 and increase a recognition range for electronic payment.

At this time, the first shielding sheet 130 and the second shielding sheet 140 disposed to overlap each other in the region corresponding to the empty space part S2 formed on the lower surface of the circuit board 110, which is the region to which the magnetic field generated from the radiation pattern 120 is concentrated, may be disposed such that edges L1 and L2 of the second portions 132 and 142 protruding from the first portions 131 and 141 are located within an edge defining the empty space part S2 formed on the lower surface of the circuit board 110 as shown in FIG. 6.

Accordingly, a magnetic field, which is generated from the radiation pattern 120 and forms a closed loop, may be directly radiated to the outside in the region, to which the magnetic field is concentrated, through the first pattern 121 not covered by the first shielding sheet 130 and the third pattern 123 not covered by the second shielding sheet 140, thereby increasing a recognition distance and a recognition rate for electronic payment.

The above-described antenna module 100 according to one embodiment of the present invention may be applied to a portable terminal such as a mobile phone, a tablet personal computer (PC), or the like.

Although one embodiment of the present invention has been described above, the spirit of the present invention is not limited to the embodiment shown in the present specification, and although those skilled in the art may propose other embodiments through the addition, change, or removal of components within the scope of the same spirit of the present invention, such embodiments are also included in the scope of the present invention.

The invention claimed is:

1. An antenna module comprising:
   a circuit board;
   a radiation pattern formed on at least one surface of the circuit board and patterned in a loop shape so that an empty space part is formed at a central part thereof;
   a first shielding sheet stacked on an upper surface of the circuit board so as to include a region corresponding to the empty space part, and comprising at least one crack that is formed to extend inward from an edge; and
   a second shielding sheet stacked on a lower surface of the circuit board so as to include a region corresponding to the empty space part, and comprising at least one crack that is formed to extend inward from an edge,
   wherein the first shielding sheet and the second shielding sheet are disposed on both surfaces of the circuit board such that areas thereof corresponding to the empty space part overlap each other,
   wherein in each of the first shielding sheet and second shielding sheet, a region overlapping the radiation pattern is not formed to be separated into multiple pieces, and
   wherein the at least one crack extends from the edge of each of the first shielding sheet and the second shielding sheet so as not to be formed in the region overlapping the radiation pattern.

2. The antenna module of claim 1, wherein each of the first shielding sheet and the second shielding sheet is a ribbon sheet of an amorphous alloy or a nanocrystalline alloy.

3. The antenna module of claim 1, wherein at least one of the first shielding sheet and the second shielding sheet is a multilayer sheet in which a plurality of sheets are stacked in multiple layers, wherein each of the sheets is a ribbon sheet of an amorphous alloy or a nanocrystalline alloy.

4. The antenna module of claim 1, wherein the first shielding sheet includes a first portion covering a portion of the upper surface of the circuit board and a second portion extending from the first portion so as to cover the region corresponding to the empty space part, and the second portion is disposed such that an edge protruding from the first portion is located within an edge defining the empty space part.

5. The antenna module of claim 1, wherein the second shielding sheet includes a first portion covering a portion of the lower surface of the circuit board and a second portion extending from the first portion so as to cover the region corresponding to the empty space part, and the second portion is disposed such that an edge protruding from the first portion is located within an edge defining the empty space part.

6. The antenna module of claim 1, wherein
   the radiation pattern includes a first pattern formed on the upper surface of the circuit board, a second pattern formed on the lower surface of the circuit board and formed in a region corresponding to the first pattern, and a third pattern formed on the lower surface of the circuit board and formed in a region not corresponding to the first pattern to form the empty space part, and
   the first shielding sheet is disposed on the upper surface of the circuit board to cover a region corresponding to the third pattern, without covering the first pattern.

7. The antenna module of claim 1, wherein the radiation pattern is a magnetic secure transmission (MST) antenna.

* * * * *